UNITED STATES PATENT OFFICE.

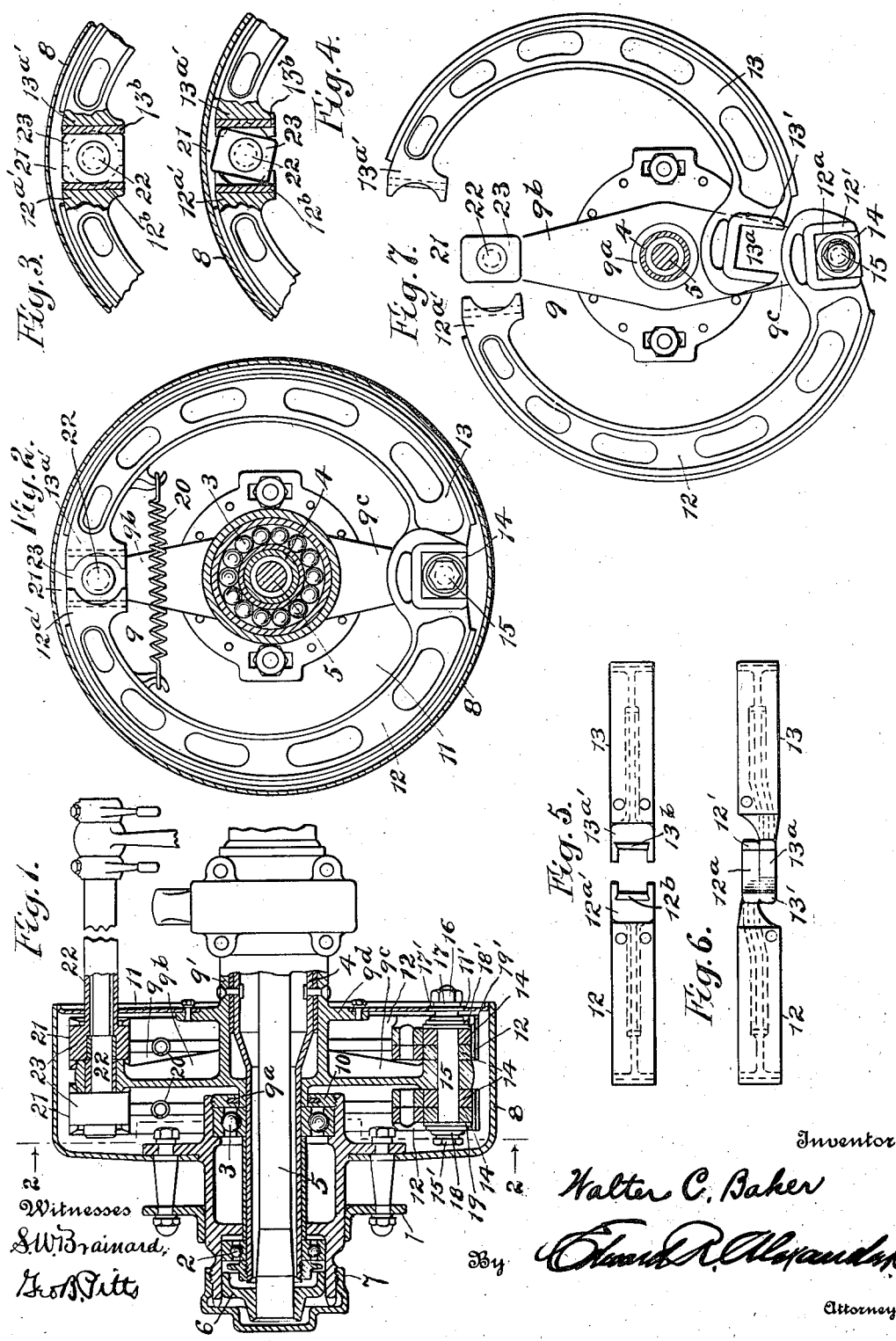

WALTER C. BAKER, OF CLEVELAND, OHIO, ASSIGNOR TO THE AMERICAN BALL BEARING COMPANY, OF CLEVELAND, OHIO, A CORPORATION OF OHIO.

BRAKE MECHANISM.

1,132,541.  Specification of Letters Patent.  Patented Mar. 16, 1915.

Application filed January 7, 1915. Serial No. 913.

*To all whom it may concern:*

Be it known that I, WALTER C. BAKER, a citizen of the United States, residing at Cleveland, in the county of Cuyahoga and State of Ohio, have invented certain new and useful Improvements in and Relating to Brake Mechanism, of which the following is a specification.

This invention relates to brake mechanism, and particularly to that type of brake mechanism having a drum and a plurality of arc shaped brake members movable into and out of engagement with said drum.

One object of the invention is to provide a brake mechanism which produces efficient braking effects upon the application of a relatively small amount of power.

Another object of the invention is to provide, in a brake mechanism of this character, supporting means which permit the brake members to accommodate themselves readily and quickly to the drum surface when operated.

Another object of my invention is so to associate and correlate the parts by means of which each brake shoe is pivotally supported, that the brake shoe may be connected to and disconnected from its pivotal mounting simply by movement of the shoe to and fro relative to its mounting.

Further objects of the invention consist of correlating the parts and causing them to co-act as hereinafter described and claimed.

For the purpose of illustration, I have, in the accompanying drawings, shown and described one form of brake mechanism embodying my invention.

Figure 1 is a fragmentary top plan view, partly in section, of a vehicle axle and wheel having a brake mechanism embodying my invention. Fig. 2 is a section on the line 2—2 of Fig. 1 looking in the direction of the arrow. Figs. 3 and 4 are fragmentary views illustrating the operation of the expanding mechanism. Figs. 5 and 6 are plan views, respectively, of the top portion and diametrically opposite portion of a pair of brake shoes. Fig. 7 illustrates the manner of connecting the brake shoes to and disconnecting them from the pivot locks.

In the drawings, 1 indicates a vehicle wheel hub mounted on anti-friction bearings 2, 3 supported upon the outer end of an axle tube or casing 4.

5 is a driven axle section extending through the axle tube 4 and connected with the hub 1 by a clutch plate 6, this connection being maintained by means of a hub cap 7.

8 is a brake drum carried by the hub 1 and rotatable therewith.

9 is a support for the brake shoes and their operating mechanism. It comprises a cylindrical section 9', secured to the axle tube 4, a cylindrical section $9^a$, incasing the tube 4 adjacent the inner end of the wheel hub, and diametrically opposed arms $9^b$, $9^c$, arranged between its said sections 9' and $9^a$.

10 is a packing gland between the inner flange of the wheel hub and the support 9.

11 is an annular closure extending between the flange $9^d$ and the inner surface of the brake drum 8, so as to practically close the inner end of the brake drum and prevent the access of dirt or dust to the brake mechanism in so far as practical manufacturing and operating limits permit.

I have illustrated two sets or couples of brake shoes, one at either side of the diametrically extending arms $9^b$, $9^c$. As these sets are alike in construction, it will be necessary to describe but one of them.

Each set of brake shoes comprises two arc shaped sections 12, 13. Their adjacent ends 12', 13', respectively, are provided with alined rectangular recesses $12^a$, $13^a$, each arranged to receive a rectangular slide 14 which is pivotally mounted on a bolt 15 which extends through the arm $9^c$. The bolt 15 at one end has a head 15'. Its other end extends through an opening 11' in the closure 11 and carries a nut 16 and washers 17, 17'.

18 is a coiled spiral spring interposed between the bolt head 15' and the washer 19. 18' is a similar spring interposed between the washers 17' and 19'. These springs provide for necessary lateral movement in operation of the brake shoes, while tending to keep the shoes of both sets in normal position and to prevent rattling of the connected parts. The connection between each of the brake shoes and the pivot 15 is such as to permit the oscillation of each shoe about the axis of the pivot 15 and the bodily movement of each shoe to and fro relative to said axis.

The ends $12^{a'}$, $13^{a'}$ of the brake shoes substantially diametrically opposite the pivot 15 are free to move toward and from each other. They are normally drawn together by means of a spring 20 secured at either end to the adjacent brake shoe. They are expanded into engagement with the inner surface of the drum through the instrumentality of an expander or cam mechanism indicated as an entirety by 21. It consists of the pivotally mounted shaft 22 carrying a cam 23, the surfaces of which are adapted to engage with the adjacent end surfaces $12^b$, $13^b$ of the brake shoes 12, 13, respectively.

The operating rod 22 for the expander for the outermost pair of brake shoes extends through the support or arm $9^b$ in which it is pivotally mounted and loosely through the tubular shaft 22 for operating the expander for the innermost pair of brake shoes. Any suitable mechanism (not shown) may be employed for actuating the rods or shafts 22 to rotate or oscillate the cams 23 carried thereby, respectively.

It will be noted that my construction is such that the brake shoes of each set are permitted sufficient movement in various directions relative to the drum to insure that when they are operated through the instrumentality of their expanding cam, they will freely and quickly accommodate themselves so as to engage considerable areas of the interior of the brake drum and that an effective braking action may be had with a relatively small angular movement of the cam. Also, that when the brake shoes are released from the drum they are automatically drawn together at their free ends.

When the brake drum 8 surrounds the brake shoe it limits the outward movement of the brake shoe in all directions.

If it is desired for any reason to remove either of the brake shoes, all that is necessary is to back off or move the brake drum 8 until the brake shoe in question is fully exposed, then disconnect the spring 20 at one end, whereupon the brake shoe may be moved away from the pivot 15 as indicated in Fig. 7 until the walls of the rectangular recess in it clear the walls of the rectangular block 14 and the brake shoe is disconnected.

To those skilled in the art of making apparatus of the class described, many alterations in construction and widely differing embodiments and applications of my invention will suggest themselves, without departing from the spirit and scope thereof.

My disclosures and the description herein are purely illustrative, and are not intended to be in any sense limiting.

What I claim is:

1. In combination, a brake drum, a pair of semicircular brake shoes each having a bearing recess at one end thereof, a support for said brake shoes, a pivotal connection between said support and the walls of said recesses in the brake shoes slidable into and out of said recesses, and means for expanding said brake shoes about the axis of said pivotal connection into engagement with said drum.

2. In combination, a brake shoe support having a laterally extending pivot, a brake drum movable to and fro longitudinally relative to said pivot, a pair of semi-circular brake shoes, each having a recess to receive said pivot and make connection therewith, and means for expanding said brake shoe into engagement with said drum, whereby when the brake drum is moved out of alinement with said brake shoes, either of them may be moved to and fro freely to connect it with or disconnect it from said pivot.

In testimony whereof I affix my signature, in the presence of two witnesses.

WALTER C. BAKER.

Witnesses:
FRED C. DORN,
EDWARD R. ALEXANDER.